United States Patent [19]

Hapke

[11] Patent Number: 4,471,394

[45] Date of Patent: Sep. 11, 1984

[54] MAGAZINE-EQUIPPED CASSETTE TAPE RECORDER-PLAYER

[75] Inventor: Walter Hapke, Hildesheim, Fed. Rep. of Germany

[73] Assignee: Blaupunkt-Werke GmbH, Hildesheim, Fed. Rep. of Germany

[21] Appl. No.: 384,418

[22] Filed: Jun. 2, 1982

[30] Foreign Application Priority Data

Jun. 19, 1981 [DE] Fed. Rep. of Germany ....... 3124270

[51] Int. Cl.³ .................... G11B 15/68; G11B 25/06
[52] U.S. Cl. ................................................... 360/92
[58] Field of Search ...................... 360/92, 69, 93, 85; 242/180, 181, 197, 198, 199, 200; 352/6, 7

[56] References Cited

U.S. PATENT DOCUMENTS

| | | | |
|---|---|---|---|
| 3,774,915 | 11/1973 | Kozu | 360/92 |
| 3,816,851 | 6/1974 | White | 360/92 |
| 3,898,692 | 8/1975 | Teruuchi | 360/69 |
| 4,247,876 | 1/1981 | Bolick | 360/92 |

FOREIGN PATENT DOCUMENTS 0013806 8/1980 European Pat. Off. .

53-132213 11/1978 Japan .

*Primary Examiner*—Robert Martin Kilgore
*Attorney, Agent, or Firm*—Frishauf, Holtz, Goodman & Woodward

[57] ABSTRACT

In order to provide a 4-cassette magazine that does not require removal from the recorder-player in order to replace one or more cassettes, the magazine is composed of a turnstile rack providing compartments fitting the cassettes and open to the periphery, seated in a shallow pan having a rim that closes off the periphery of the turnstile except for one gate opening through which a cassette may be ejected or inserted when a compartment containing it is in registry with the gate opening. The stationary pan is part of a deck on which is mounted a rim drive for the turnstile which is combined with an indexing device and arranged to controllably propel a cassette into or out of a compartment when the turnstile is stopped. The pan has an aperture for a cassette lowering and raising device onto which a cassette is slid by the turnstile to bring it into operating position. Another aperture serves to assist cassette insertion or ejection.

12 Claims, 3 Drawing Figures

MAGAZINE-EQUIPPED CASSETTE TAPE RECORDER-PLAYER

This invention concerns a tape recorder-player for for miniature cassettes, sometimes referred to as minicassettes or microcassettes, and in particular a tape recorder-player having a bidirectional auto-reverse tape drive which is capable of playing several cassettes completely and in succession without requiring manipulation to turn the cassette over to play it completely or to advance a magazine to play the next cassette.

Miniature cassettes have become widely used, mainly for dictating machines, but in the meanwhile they have also come into use to some extent in high-fidelity audio equipment and systems, even stereo music systems, because of the handiness of microcassette equipment.

Since the minicassettes have the same playing time as the previously conventional CC cassettes (so-called compact cassettes), minicassette players and recorders are of particular interest because of their small space requirements, which applies both to the tape drives and to the cassettes themselves, for use in motor vehicles, particularly when integrated with an automobile radio set.

In the copending application of Horst Timm, Ser. No. 354,728, filed Mar. 4, 1982, owned by the assignee of this application, a tape recorder-player for miniature cassettes is shown for use with an auto-reverse tape drive and with a rotary cassette magazine of a configuration which is particularly compact when the magazine is designed for holding four cassettes. The system there disclosed, however, for insertion and removal of cassettes, especially for replacement of cassettes in the magazine, leaves a great deal to be desired and the magazine itself is made of a number of parts and the system for advancing it involves considerably expense of manufacture.

The Invention

It is an object of the present invention to provide a minicassette tape recorder player suitable for vehicular installation in which several minicassettes can be played in a selectable sequence without requiring manipulation and in which while one cassette is playing another of the several cassettes in the same magazine is in position for convenient removal and/or replacement. It is also an object of the invention to make the magazine reliable and inexpensive, and to make replacement of cassettes possible without removal of the magazine from the recorder player. It is a further object of the invention to provide a drive for the advancement of the magzine that can conveniently also operate to assist in the insertion and/or the ejection of a cassette.

Briefly, the cassette magazine is made in two parts, one carrying a cassette handling drive. The rotary part of the magazine is simply a compartmented t;urnstile unit and it moves in a stationary part that acts as a socket or a well-fitting seat. The turnstile unit has a wheel member with a continuous circular rim and carries partitians which define the compartments. The compartments of the turnstile unit, into which fir the cassettes that are moved around by it, are each bounded on two sides by partitions running at right angles to each other and separating one of the longer sides of one compartment from a narrower side of an adjacent compartment. The compartments are bounded on a third side by an additional wall parallel to one of the separator walls, the fourth side of each compartment being open for insertion or removal of a cassette into or from said compartment through the periphery of the turntable in a direciton parallel to the additional compartment wall just mentioned. At the center of the turnstile the compartment partitions enclose a square cavity which can serve as a hub for the turnstile for pivoting about a collar or shaft penetrating into the cavity. The stationary unit is preferably mounted as a deck at the top of the recorder player. It has a central projection for entering into the hub aperture of the turnstile and an encircling rim which pretects the turnstile and keeps the cassettes which are not in the replacement position from getting out of their compartments. An opening is provided at the location of a cassette in the recording/playing station for allowing a cassette to be moved vertically out of the turnstile onto the drive elements of the recorder-player. Means are provided, preferably a rim drive, for moving the turnstile stepwise to bring a new cassette into the operating position and a new cassette into the replacement position with each step. An indexing device has a pin which can pass through any of the apertures provided for the purpose in the peripheral wall portions of the Turnstile locking the magazine in any one of its four operating positions. The indexing lever is advantageously combined with the rim drive in such a way that the drive roller can be swung so as to engage a cassette being inserted into or removed from a compartment in the turnstile, and an aperture is also provided below the cassette replacement station to allow the same frive also to perform a final stage of inserting a cassette into position or the initial stage of ejecting it.

Preferably the openings for the cassette compartments are arranged for lengthwise insertion and removal of the cassettes, but they may be arranged for broadsides insertion and removal. The turnstile is preferably open at the bottom and covered at the top, so that the cassettes are loaded into it one by one through the peripheral opening and the rotation of the magazine simply slides the cassettes around the deck below and, in the operating position onto a cassette drop-and-lift mechanism of the recorder-player, which moves in an aperture shaft of the stationary unit of the magazine.

The invention has the advantage that it very simply makes possible the complete playing of a cassette while the turnstile is fimly positioned in any one of its four positions while at the same time a cassette in the re-placement position can be replaced without interrupting the playing of the cassette in the operating position. Of course with this arrangement automatic stepping of the magazine from one position to the next following the playing of a cassette is easily provided and the full playing time of both sides of one cassette is available for replacing a cassette that has already been played which is presented in the replacement position. The structure of the turnstile and of the deck on which it is seated above the recorder-player casing are simple to manufacture and the space requirements are kept to a minimum.

THE DRAWINGS

The invention is further described by way of illustrative example with reference to the annexed drawings in which:

FIG. 1 is a front view of a tape recorder-player equipped in accordance with the present invention;

FIG. 2 is a top view of the player of FIG. 1 with a turnstile in place and with the top cover of the turnstile removed to show compartments and cassettes therein; and FIG. 3 is an exploded perspective view showing the turnstile, the deck structure of the recorder-player on which it is seated and its associated drive and also, in a diagrammatic fashion, the tape drive elements of the equipment located below the deck.

DESCRIPTION OF THE ILLUSTRATED EMBODIMENT

Figure 1:
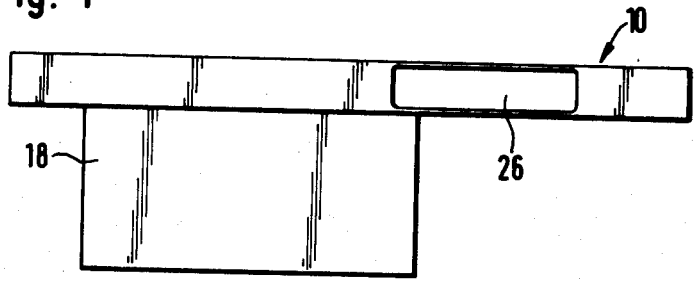

The embodiment illustrated in the drawings has a cassette changing apparatus according to the invention generally designated 10 consisting essentially of a turnstile unit 12 which is a compartmented rack fitting into a seating structure 14 therefor hereinafter referred to as a deck located on top of an apparatus casing 18 containing other components of the tape recorder-player. The turnstile unit 12 is seated so as to rotate about an axis 16 in a manner further described below.

The deck 14 is fixed on the casing 18 which contains the drive and the recording and playing heads and associated equipment of a tape recorder-player. Usually the tape recorder-player, particularly if it is to be installed in a motor vehicle, will be combined with a radio receiver, but for simplicity of illustration that is not shown in the drawings here and the controls and indicators that would normally be present on the front panel are likewise omitted, even for the tape recorder-player itself. As already mentioned, the tape drive is of the bidirectional auto-reverse type. The tape recorder-player, even when combined with a radio receiver is today so compact, particularly when the loudspeakers are somewhere else in the vehicle rather than on the dashboard, that the deck 14 and the magazine 12 are likely to extend to one side or both as shown in FIG. 1, even though the minicassettes themselves are not very large. The arrangement of FIG. 1 is of course purely illustrative and the apparatus can be designed for projection of the deck to the left or to the right or partly in each direction.

The illustrated cassette change apparatus 10 serves to seat four microcassettes 1, 2, 3 and 4 similarly arranged around the axis of rotation 16 of the turntable 12. The arrangement is constituted that in each case a long and a short side of neighboring cassettes together from one side of a square of which the diagonals cross at the location of the axis of rotation 16.

The turnstile unit 12 consists in this case of a circular disk 20 (see FIG. 3) which is subdivided on its underneath side, by partition walls 22 and 24 extending vertically from the disk surface, into cassette compartments 26 which are open at the bottom. These compartments are also open on one side at the periphery 28 of the turntable magazine making the compartments accessible for inserting or removing cassettes when the turntable is in position on the deck 14.

Figure 2:
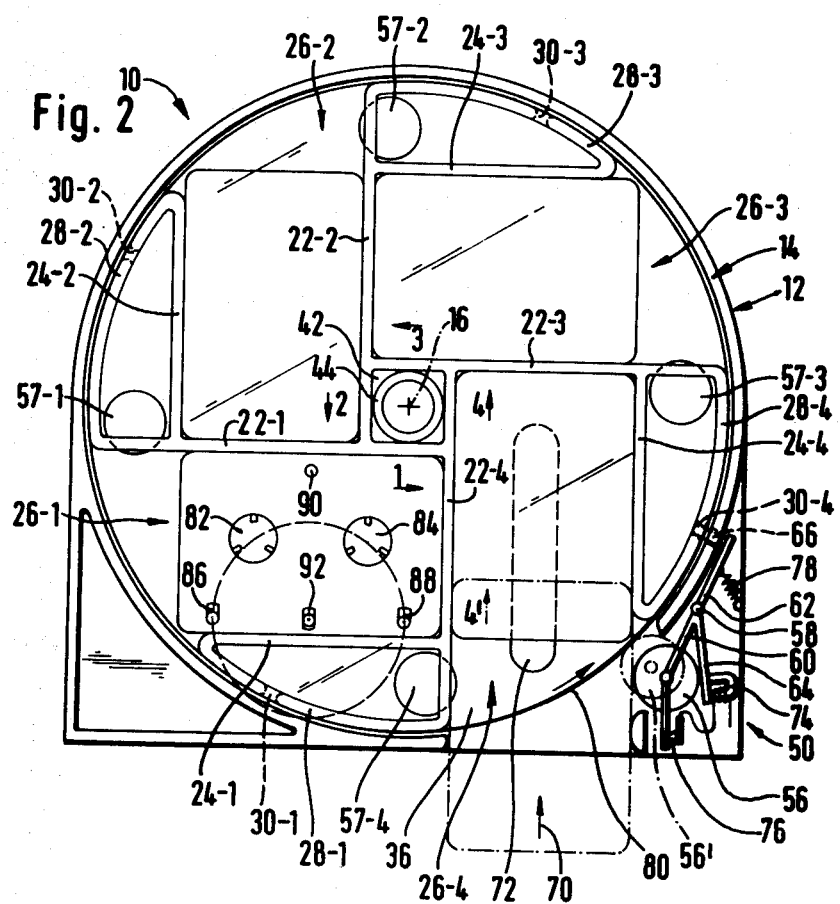

As is most clearly recognizable in FIG. 2, the compartments 26 constituted as cassette insertion cavities are arranged so that their parallel sets of boundary walls 22 and 24 coincide and the compartments succeed each other in the circumferential direction at 90° intervals. The partition walls and the compartments themselves are therefore numbered with a suffix relating to the cassette in question, thus 22-1 ... 22-4, 24-1 ... 24-4 and 26-1 ... 26-4. Between the insertion openings of the compartments 26 peripheral vertical walls 28-1 ... 28-4 which are concentric about the turnstile center 16 in effect form portions of a cylindrical rim wall interrupted by the compartment openings. In each of these ring sectors 28-1 to 28-4 there are located at relatively the same location and hence at equal spacing from each other apertures 30-1 to 30-4 to provide indexing of the turnstile in the manner to be described below. The deck 14 formed as a fixed chassis portion or as a plate affixed to the recorder-player chassis has its principal portion in the form of an upwardly open flat shallow pan with a floor 32 centered on the axis 16 and a rising cylindrical rim wall 34 which is interrupted by a single large opening 36 which can be flush with any one of the insertion openings 26-1 ... 26-4 of the turnstile unit according to the positioning of the turnstile At the location of the tape drive and head a window 38 is provided in the floor 32 of the deck which can further be equipped, as shown in FIG. 3 with a downward flange for a guiding shaft for vertical movement of the drive mechanism.

An aperture 40 in the deck rim wall 34 is provided for registering with one of the holes 30-1 ... 30-4 of the peripheral wall of the turnstile unit 12. The parallel sets of partition walls 22-1, 22-3, 24-1, 24-3 and 22-2, 22-4, 24-2, 24-4 which are perpendicular to each other run up against inner and outer edge limits of a compartment 26 with their rear end edges in each case at right angles to the partition wall 22 of a neighboring compartment 26. Each inner side wall 22 of a compartment 26 thus at the same time provides the rear end wall of the neighboring compartment. The end sections continuing past the center of revolution 16 at some offset therefrom, in each case at the same spacing, form a square central cavity 42 surrounding the center of rotation.

Figure 3:
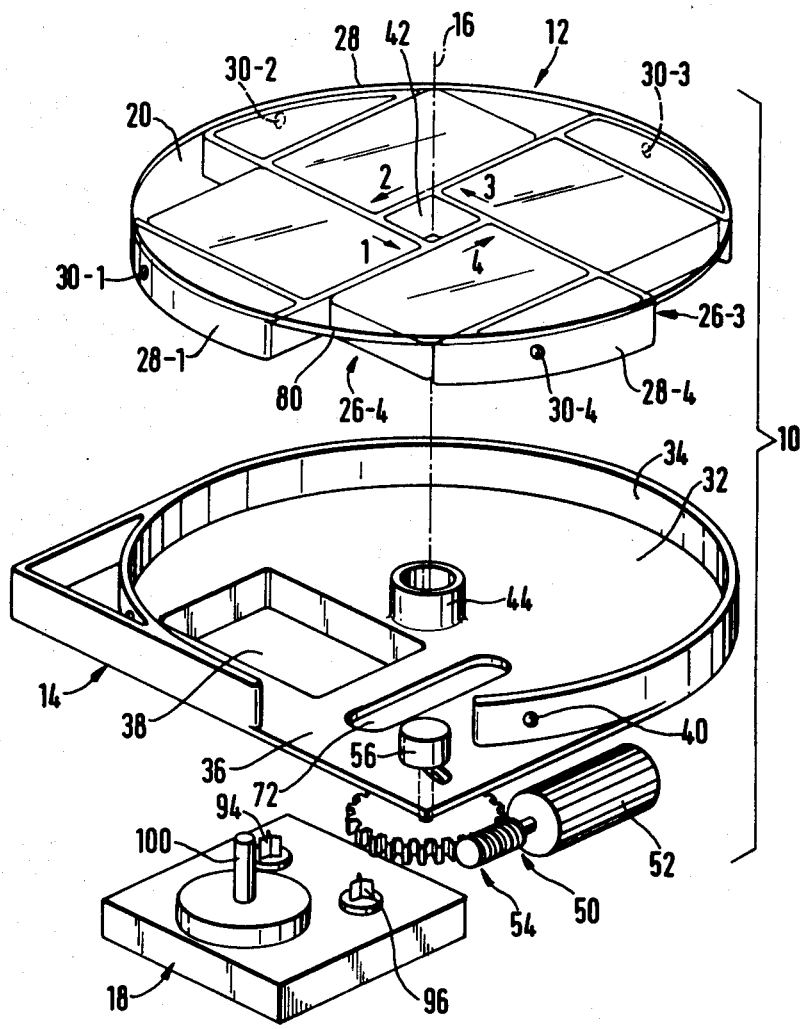

In this cavity which may be open both upwardly and down or only downwardly, as shown in FIG. 3, there projects in the assembled condition of turnstile and deck a bearing post 44 extending up from the floor of the deck, in the illustrated case formed as a collar or bushing. Its diameter and axial length are fitted to conform with the bearing aperture 42.

In the illustrated example the bearing collar 44 extending into the aperture 42 cooperates with the peripheral wall 34 of the deck 14 externally fitting the cylindrical sector walls 28 of the turnstile unit to provide a trouble-free guiding of the rotary movement of the turnstile 12 when it is assembled in the seating cavity for it provided by the deck 14.

The geometrical disposition above-explained of the microcassettes 1–4 in a common plane of revolution lying on a square surface of minimum dimensions has the advantage that the space subdivided into individual compartments 26 by the partition walls 22 and 24 and enclosed by the floor 32 and the ring wall 34 of the deck as well as by the circular desk 20 of the turntable 12 has the smallest possible volume for a such a cassette changing device. Especially for a combined auto radio and tape recorder-player equipped with a cassette interchange 10 according to the invention, the arrangement here shown has the advantage that for each insertion opening 36 of a compartment 26 presented to the front of the apparatus, only a minimum front panel area is needed, about the area of one of the shorter cassette's narrow sides.

An advantageously simple drive 50 combining the functions of turnstile advance and insertion or removal of cassettes, which for example, can be constituted as a friction drive, it is illustrated in FIG. 2 in the region of the insertion opening 36 in the rim 34 of the deck.

The drive 50 has a motor 52 disposed for example below the deck 14 as illustrated in FIG. 3 which drives a gripping friction roller 56 having a soft friction coating of rubber or the like, the drive being accomplished through a geared connection 54.

The drive roller 56 is in the illustrated case mounted on a common carrier plate with the drive element 52 and 54, which pivots about an axis 58 which is parallel to the axis of rotation 16 of the turnstile 12, as shown in FIG. 2.

The basic construction of the positioning mechanism for the controlled pivoting movement of the drive 50 about the axis 58 is schematically indicated in FIG. 2. As thereshown a rigid 3-armed lever, with arms designated 60, 62 and 64, is provided to fix the basic relation of the positioning and drive elements which swing about the axis 58 together while maintaining there positions relative to each other.

The pressure roller 56 is rotatably mounted on the free hand of the lever arm 60, while the diametrically opposite free hand 62 carries an indexing pin 66 that can extend radially through the bore 40 in the rim 34 of the deck 14 into a back of one of the bores 30, in the illustrated case the bore 30-4, which is brought into position flush with the bore 40 by the rotary position of the turnstile 12. The bores 30-1 . . . 30-4 are provided in the cylindrical ring wall sectors 28-1 . . . 28-4 at the rim of the turnstile 12. When the indexing pin 66 penetrates into one of the bores 30, it secures the turnstile 12 against rotation. Thus when it is in the bore 30-4, in the illustrated case, the compartment 26-4 has its insertion opening flush with the insertion opening 36 in the rim 34 of the deck 14 in order to make a cassette replacement in that compartment possible. For such a replacement operation the drive roller 56, which is now opposite the outer end section of the partition wall 22-4 which extends all the way to the opening 36 in the wall 34 of the deck and now projects into the insertion passage of the cassette compartment 26-4, so that a cassette 4 introduced in the direction of the arrow 70, shown in an intermediate position in broken lines designated 4', is moved by friction between the drive roller and the adjacent cassette sidewall, moving into the compartment 26-4 bounded by the partition walls 22-3, 22-4 and 24-4.

For carrying out removal of a cassette the direction of drive of the drive roller 56 is reversed by switching over the motor 52. In this operation, other elements not shown which are controlable by the drive motor 52 can be brought into operation for action through a slot 72 in the floor of the deck 14 by engagement with the cassette lying in the compartment 26 located above the slot, in order to bring the cassette into the region in which the drive roller 56 can operate on it for completion of the ejection of the cassette.

To facilitate the operation of the drive roller 56 in the insertion and removal of cassettes, there can conveniently be provided rollers 57-1, 57-2, 57-3 and 57-4, shown in FIG. 2 in broken lines, with their peripheries projecting slightly through apertures in the front (outer) sections of the partition walls 22. These rollers should be mounted for free rotation, for example, on shafts extending down from the cover disk 20 of the turnstile 12 in the space between a compartment 26 and one of the cylindrical rim wall segments 28. In the position shown for the drive roller 56 more or less opposite the idler roller 57-4 in FIG. 2, these rollers assure trouble-free cassette replacement by reduction of friction during insertion and ejection of the cassettes.

The lever arm 64 which is obliquely bent with respect to the arm 60 as shown in the drawing serves as an armature for an electromagnic 74 for determining the angular position taken by the drive roller 56 for insertion or ejection of a cassette. For control of the electromagnetic 74 a switch 76 is provided for actuation by a bent over end portion of the lever arm 60.

After a cassette as above explained, has been propelled into one of the compartments 26, the switch 76 opens and the magnic 74 is deenergized, so that the indexing pin 66, for example, as the result of the restoring force of a tention spring 78 stretched between a fixed point on the apparatus and the lever arms 62, is pulled out of the indexing aperature 30-4 of the turnstile, releasing the indexing lock.

At the same time the pressure roller 56 mounted on a bearing on the lever arm 60 is swung into its position 56' in which, under the force of the spring 78 it is in driving contact with the uninterrrupted peripherial edge 80 of the circular disk 20 of the turnstile 12. The turnstile is then rotated further in accordance with FIG. 2, for example in the counter clockwise direction, until the next compartment, here the compartment 26-1, reaches the loading or replacement position, in which the indexing pin 66 and the pressure roller 56 are swung back into the position shown in FIG. 2 by the electromagnic 74 as a result of the closing of this switch 76.

If desired the switch 76 can be controlled by an electronic search system that permits a particular selected cassette to be placed into playback position and at the same time another cassette into replacement position. Such a system may require contacts or other features for indicating the orientation of the turnstile to the electronic control, but these need not be described further, since such systems are well known, for example in the selection of photograph slides for presentation from a rotary tray and the problem for selection among four cassette compartments is a great deal simpler.

In the illustrated example the window passage 38 in the floor 32 of the deck 14 through which the cassette tape transport mechanism 18 passes is located next to the insertion opening 36 of the wall 34. In accordance with FIG. 2 the microcassette 1 is therefore above the tape drive and can be taken out of the compartment 26-1 by means of the cassette lift of known construction and put onto the drive elements of the drive mechanism 18. After it has been completely played it can be moved back into the turnstile compartment 26-1. In this case the window 38 should be large enough for passage of the cassette under control of a conventional type of mechanism for raising or lowering the cassettes which may, for example, drive a sleeve inside the guide shaft shown in FIG. 3 connected to the window 38 in the floor of the deck.

Microcassettes, as shown for the cassette 1 in FIG. 2, having a pair of tape spool openings 82 and 84, the axes of which are parallel, also front and rear reference holes 86 . . . 90 and a cap stand shaft opening 92 in the mid-region of the front side of the cassette.

As shown in FIG. 3 the auto reverse tape drive 18 correspondingly has, in addition to two spool drives studs 94 and 96 and unshown reference pins, a single driven cap stand 100 for both directions of tape transport. For operation of the drive a pressure roller in a magnetic head with known types of positioning and control means are moved against the cap stand shaft and the tape respectively when a cassette has been pushed onto the drive elements of the tape drive.

In the illustrated embodiment the cassettes are shown with there edges forming sides of a square by the cassette arrangement. Such arrangements, of course, one being a mirror image of the other, and of course both may be used with a corresponding disposition of the tape drive and of turnstile advance and cassette insertion-ejection drive.

The apparatus of a conventional type usable for controlling the tape transport and the cassette lift mechanism can easily be arranged to control also the locking of the turnstile 12 against rotation while a cassette is located in operating position on the tape drive (for example by control of the electromagnet 74).

Furthermore, the partition walls defining the cassette compartments and the insertion opening 36 provided in the deck structure 14 can be so designed that the cassettes can be inserted broadsides rather than endwise and of course the insertion aperture 36 can be at the left of center in front rather than to the right of center.

Although the invention has been described principally with respect to a particular illustrative example, it is therefore evident that variations and modifications are possible within the inventive concept. As a further example, it is possible to provide a turntable unit operating in essentially the same manner which is located below the remainder of the recorded-player apparatus, in which case the stationary socketseat for the turnstile must be suspended from above and it must include a top plate which may be the bottom of the recorder-player chassis with an aperture through which the tape heads and drive would be lowered into the cassettes. In this case the turnstile must be open at the top rather than at the bottom and a bottom disk can carry the cassetes around, rather than requiring them to be slid around. Such a modification would not have many of the advantages of the illustrated embodiment but would have some of the advantages mentioned in the objects of the invention at the beginning of the specification.

I claim:

1. In a magnetic tape cassette recorder-player having a tape drive and recorder-player heads capable of operation in either direction and equipped with autoreverse means for operation at one end of the tape in a cassette, apparatus for providing a set of cassettes for recording or for playing in automatic succession comprising:

a rotary cassette transport turnstile unit in the form of a compartmented unit of cylindrical contour having a wheel member (20) providing a continuous circular periphery at its edge on which member there are supported, radially inwards of said periphery, two perpendicular sets of parallel partition walls defining the edge boundaries of four cassette compartments each open towards said wheel member periphery, first and second partition walls of each said set (22-1, 22-3; 22-2, 22-4) each serving to separate one of the longer sides of one of said compartments from one of the shorter sides of an adjacent compartment and also together enclosing, by virtue of the difference between the length and width of the cassettes for which said compartments and dimensioned, a central cavity (42) centered on the axis of said wheel member which is open in at least one axial direction, and third partition walls of each said set (24-1, 24-3; 24-2, 24-4) respectively serving to define a third boundary wall of each compartment which is the most remote of that compartment's boundary walls from the axis of said wheel member, said magazine also having on its periphery index catch means (30) for fixing four positions of said turnstile at intervals of 90° of rotation;

a stationary socket unit fitting said turnstile unit and having an enclosing rim for closely and concentrically surounding said wheel member of said turnstile unit and the cassette compartments supported on said wheel member except for a single large opening in said rim of a size sufficient for passage of a cassette directly out of the open side of one of said compartments, said rim also having an aperture for access to said index catch means of said turnstile unit, said stationary socket unit also having a pivot-defining projection for fitting into said central cavity of said turnstile unit and further providing an aperture for relative movement of a cassette and tape drive into and out of a compartment of said turnstile unit which is located in an operating position defined by said stationary socket unit;

turnstile drive means (50) mounted on said stationary socket for driving said turnstile unit stepwise in 90° increments of rotation with stops between said rotation increments and for controllably ejecting a cassette inserting a cassette through said aperture of said rim of said stationary socket unit during a stop of said turnstile unit rotation, and indexing means coordinated with said drive means (50) and said index catch means (30) for arresting and stepwise 90° increments of rotation at a position permitting recording or playing operation with a cassette in one compartment of said turnstile unit and ejection of insertion of a cassette from or into another compartment of said turnstile unit.

2. Apparatus as defined in claim 1 in which said stationary socket unit forms a deck at the top of the cassette recorder-player and provides a seat for said turnstile unit substantially in the form of a shallow pan having said pivot projection rising upward in the middle thereof and having said aperture in the floor thereof for passage of a cassette downward therethrough for engagement with said tape drive, and back, and in which to be completed by the adjacent surface of said stationary socket unit.

3. Apparatus as defined in claim 2 in which said compartments of said turnstile unit are open to the periphery of said turnstile unit on one of the shorter compartment sides, whereby cassettes are removable and insertable endwise from or into a compartment standing still in reloading position on said stationary socket unit.

4. Apparatus as defined in claims 2 or 3 in which said turnstile unit has a peripheral wall extending at least part way from the open side of each compartment to the open side of each adjacent compartment, and in which said index catch means is constituted by apertures respectively provided in said peripheral walls.

5. Apparatus as defined in claims 1, 2 or 3 in which said compartments are so constituted that when cassettes are situated in all said compartments, the edges of said cassettes farthest removed from the axis of said turnstile unit substantially form a square of which the corners are near the periphery of said turnstile unit.

6. Apparatus as defined in claim 1 in which said turnstile drive means (50) is a drive including a driving wheel (56) arranged for engaging the rim of said wheel (20) member of said turnstile unit for advancing the same.

7. Apparatus as defined in claim 6 in which said driving wheel is a friction roller.

8. Apparatus as defined in claim 2 in which said turnstile driving means (50) is a drive including a driving wheel (56) arranged for engaging the rim of said wheel (20) member of said turnstile unit for advancing the same.

9. Apparatus as defined in claim 8 in which said driving wheel is a friction roller which is shiftable, when said turnstile unit is stopped in indexed position, into a position for engagement with the edge of a cassette entering or leaving the adjacent compartment of said turnstile unit.

10. Apparatus as defined in claim 9 in which at least said driving wheel of said rim drive is mounted on a pivoted support which also provides a part of said indexing means.

11. Apparatus as defined in claim 8 in which said stationary socket unit has a second aperture in the floor of the pan portion of said stationary socket unit, located for access of said drive unit to the bottom of a cassette located in a compartment the open end of which is in registry with said single large opening in the rim of said stationary socket unit.

12. Apparatus as defined in claim 9 in which electrically controlled shift means (26,74) are provided for putting said driving wheel (56) into a position for engagement with a cassette.

* * * * *